June 22, 1965  E. J. KOCHER  3,190,468
BIN UNLOADER

Filed Nov. 20, 1963  2 Sheets-Sheet 1

INVENTOR.
ERICH J. KOCHER
BY
Lieben & Niller
ATTORNEYS

June 22, 1965 E. J. KOCHER 3,190,468
BIN UNLOADER

Filed Nov. 20, 1963 2 Sheets-Sheet 2

INVENTOR.
ERICH J. KOCHER
BY
Lieben & Niller
ATTORNEYS

United States Patent Office 3,190,468
Patented June 22, 1965

3,190,468
BIN UNLOADER
Erich J. Kocher, Milwaukee, Wis., assignor to Vilter Manufacturing Corporation, Milwaukee, Wis., a corporation of Wisconsin
Filed Nov. 20, 1963, Ser. No. 325,050
5 Claims. (Cl. 214—17)

This invention relates to bin unloaders and more particularly to unloading mechanisms for bins or hoppers into which material is loaded at an upper portion thereof and discharged through the bottom with the assistance of discharge means.

Bin unloaders which discharge material from the bottom of the bin or hopper are well known in the art. Many bins or hoppers also have sloping or conical bottom surfaces terminating in a discharge opening. Serious problems have heretofore been encountered however in the repair and maintenance and even in the operation of these prior unloading devices since it is extremely difficult to remove unloading mechanism when material fills the bin and covers the device to be removed for repair or replacement.

It is therefore a primary object of this invention to provide an improved removable material unloading device for a bin or hopper having a substantially conical bottom.

In the preferred embodiment, a material conveyor is provided for a bin or hopper having a conically shaped bottom, and wherein the material unloading device or conveyor sweeps around the conical bottom surface to loosen and scrape material therefrom and facilitate flow thereof through a central bin discharge opening. Further, the preferred embodiment discloses a chain-type scraper mechanism in the nature of an endless conveyor which travels an elliptical path substantially parallel to the sloping surface of the bin bottom as the scraper mechanism is rotated about the central axis of said bin. The apparatus includes motor drive means for simultaneously rotating the scraper mechanism about the bin central axis and for driving a chain-type scraper or conveyor mechanism in said elliptical path.

In the preferred embodiment, the conveyor mechanism and the drive therefor are moreover carried as a unitary assemblage on a common support and may be easily removed from the bin or hopper as a unit for repair or replacement of either a part or all of the conveyor mechanism including the motor drive therefor. Morever, the scraper or conveyor mechanism and the drive therefor are so arranged that the scraper or conveyor is returnable to the interior of the discharge portion of the bin without need for emptying the same, the motor drive being instrumental in causing the scraper mechanism to, in effect, pull or eat its way through the material in the hopper back to the normal operating position of the scraper mechanism.

The removal of many kinds of material from a conical hopper is facilitated by such a scraper mechanism, and it has been found to work especially well in a bin or hopper for discharging ice flakes or the like. It has been found to be a simple matter to remove and repair the scraper quickly in the event of scraper failure and to return the scraper mechanism to the hopper before excessive melting of the ice flakes occurs.

It is therefore an additional object of this invention to provide an improved scraper means for a discharge hopper which obviates all of the aforesaid disadvantages and objections of prior devices.

Another object of the invention is to provide an improved removable discharge assistance means for the discharge end of a bin or hopper.

Still another object of this invention is to provide an improved discharge assistance means that is readily removable through the discharge opening of a bin or hopper.

An additional object of the present invention is to provide an improved powered discharge assistance means for a bin or hopper having sloping discharge surfaces wherein said powered discharge assistance means is readily removable through a discharge opening, and wherein said powered discharge assistance means can be easily returned to discharge assistance position within said bin or hopper under power.

It is another object of this invention to provide a discharge assistance means for sweeping along a conical discharge surface, and wherein said discharge assistance means can be readily removed along said discharge surface through a discharge opening.

These and other objects and advantages of the invention will become apparent from the following detailed description.

A clear conception of the several features constituting the present invention and the mode of constructing and operating a discharge assistance means for a bin or hopper embodying the improvements may be had by referring to the drawings accompanying and forming a part of this specification, wherein like reference characters designate the same or similar parts in the various views.

While the improvements have been illustrated and described as being especially advantageously embodied in a discharge structure for a conically bottomed hopper, it is not intended to thereby unnecessarily limit or restrict the invention. It is also contemplated and that certain descriptive terminology used herein shall be given the broadest possible interpretation consistent with the disclosure.

Figure 2:
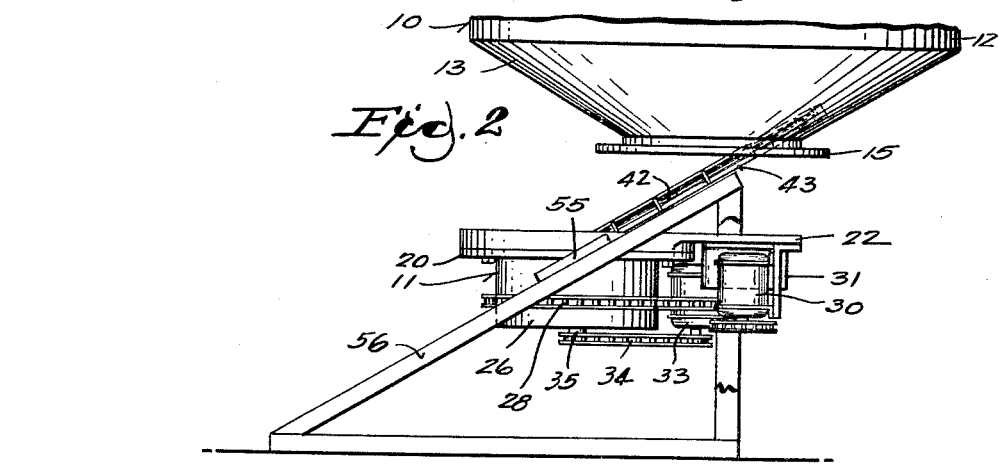
FIGURE 2 is a side elevational view of reduced proportions of the discharge structure of FIGURE 1 moved from the hopper.

Referring to the drawings, the reference numeral 10 designates generally a bin or hopper, and the reference numeral 11 designates generally the discharge structure for the hopper. The hopper 10 in the preferred embodiment is shown as having cylindrical sides 12 and a frustoconical bottom 13 provided with a discharge opening 14. The hopper 10 is supported by structure (not shown) a desired distance from a floor or the like as shown in FIGURE 2 to allow for the removal of the discharge structure 11.

Integral with bottom 13 is an annular flanged member 15 for attaching discharge structure 11 to the hopper as by a plurality of bolts 16. To remove the discharge structure 11 from the hopper, it is necessary to remove nuts 17 of bolts 16.

The discharge structure 11 comprises an annular bearing support 20 for bearings 21 which is secured to a motor support flanged member 22 as by bolts 23. With member 22 and bearing support 20 fastened, a recess 24 for supporting flange 25 of cylindrical chute 26 is provided. The flange 25 is rotatable on bearings 21 when chute 26 is rotated through sprockets 27 engageable with a chain 28 driven by sprocket 29 rotated by motor 30 through gear reducer means 31.

The motor 30 and gear reducer means 31 are secured to motor support flanged member 22 as by fasteners 32. Also secured to member 22 is a motor 33 for driving a chain 34 and bevel gear shaft 35. With the motors thus mounted on member 22, they are removable with member 22 so that the discharge structure 11 is powered whether it is attached to or removed from the hopper 10.

Figure 3:
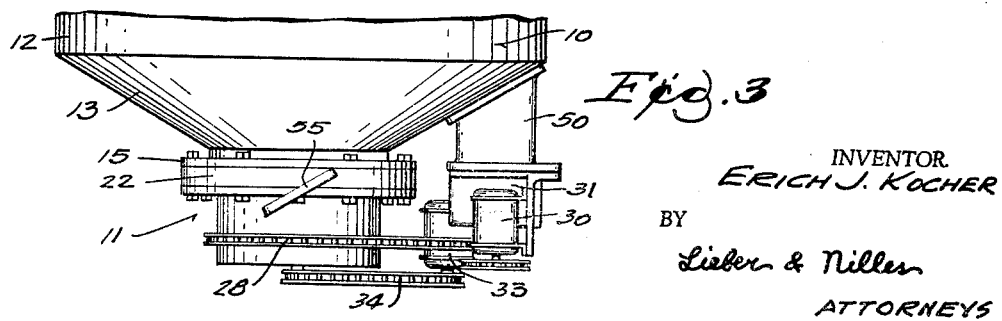
FIGURE 3 is a side elevational view of a modification of discharge structure for a bin or hopper.
Figure 4:
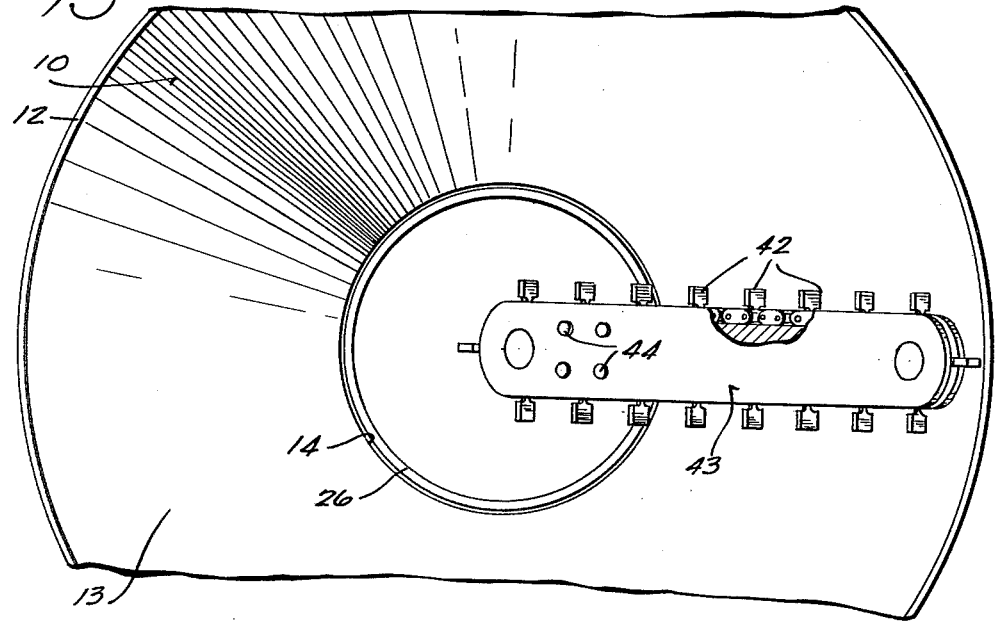
FIGURE 4 is a partial plan view of the hopper and discharge structure of FIGURE 1.
Figure 5:
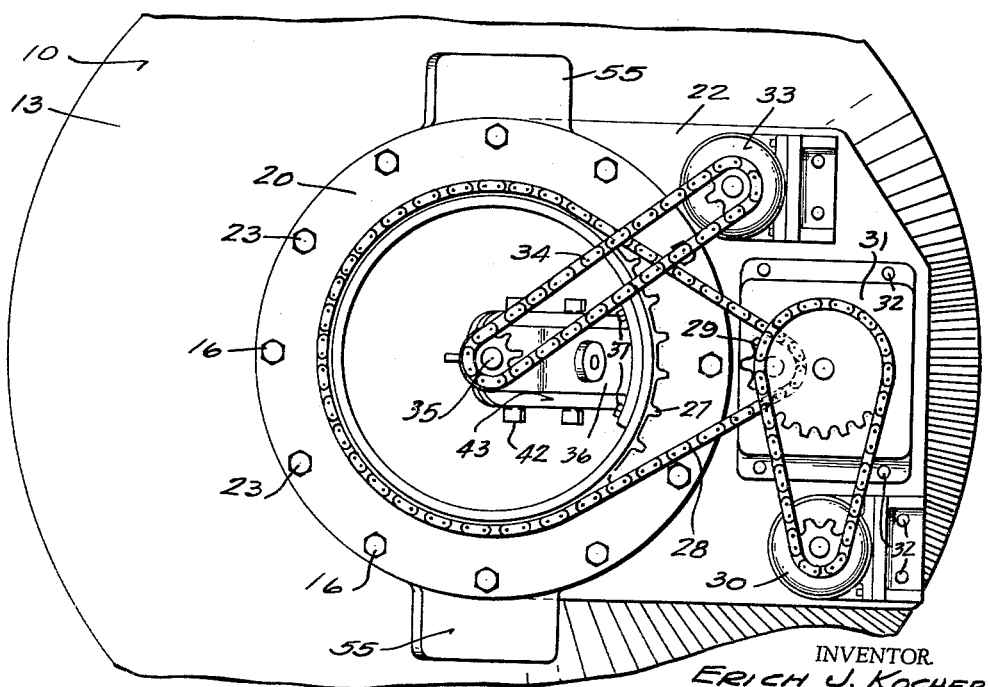
FIGURE 5 is a plan view of the structure of FIGURE 1 taken along line 5—5 of FIGURE 1.

In the modification shown in FIGURE 3, a motor support member 50 is attached to the hopper 10, and the drive motors 30, 33 remain attached to the member 50 when the discharge structure 11 is removed from the hopper. In this modification, the chains 28, 34 must be removed to facilitate removal of the discharge structure 11.

Further, in reference to FIGURES 1, 2, 4, and 5, the bevel gear shaft 35 is rotatably supported on support braces 36 secured to the inner wall of chute 26 as by fasteners 37. Thus, the support braces 36 rotate with chute 26 when the chute is driven by chain 28. The bevel gear shaft 35 is coaxial with the centerline of rotation "A" of chute 26.

As chain 34 is driven by the motor 33 to rotate shaft 35, the bevel gear 38 rotates bevel gear 39 to turn shaft 40 rotatably supported by support braces 36. A sprocket 41 driven by shaft 40 rotation engages endless chain scraper 42 supported in scraper housing 43, which is secured to flanges 45 of support braces 36 as by fasteners 44.

Figure 1:
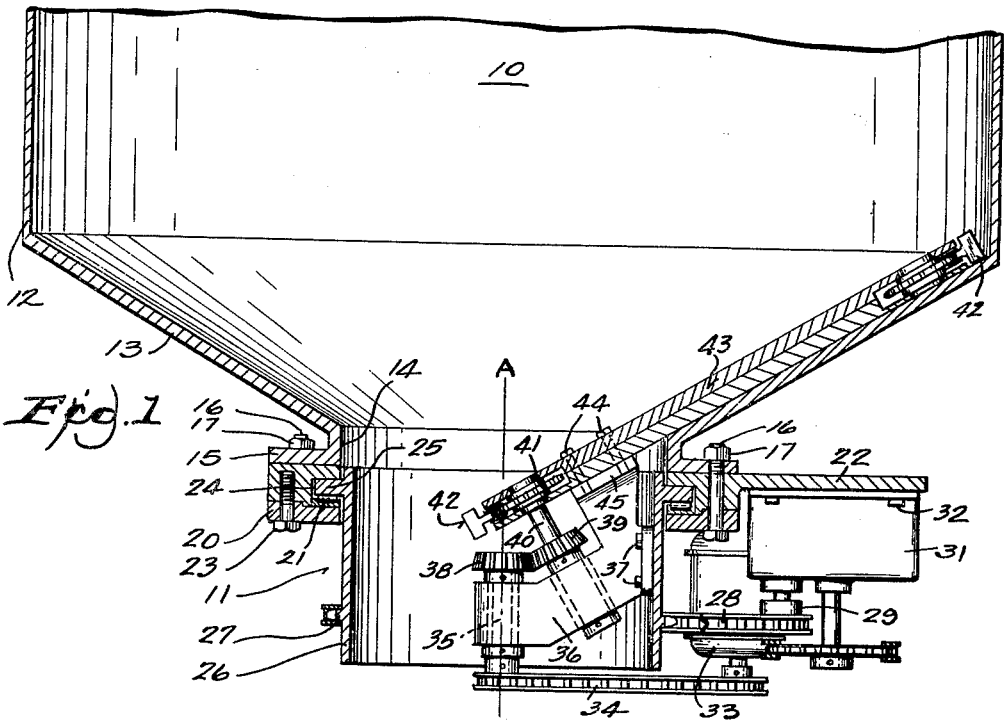
FIGURE 1 is a side elevational view in partial section of a hopper and discharge structure employing the invention.

As viewed in FIGURE 1, the chain housing 43 and scraper 42 extend along conical surface 13 and substantially parallel thereto. Thus, as the scraper 42 and housing 43 are supported on braces 36 which rotate with the rotation of cylindrical chute 26, the scraper sweeps over the conical bottom 13 about axis "A." At the same time, with motor 33 driving chain 34 to rotate scraper 42 within housing 43, the scraper contacts material on the hopper bottom 13 and moves or scrapes it toward the discharge opening 14 through chute 26 for suitable disposal.

Thus, the entire discharge structure 11 in the embodiment shown rotates relative to hopper bottom 13 to assist in the discharge of material from the hopper 10.

On occasion, when it is necessary to repair or replace the discharge structure or a part thereof, such as the chain scraper 42, it is advantageous to remove the entire discharge structure 11 from the hopper 10. The removal is accomplished by removing bolts 16, so that the discharge structure 11 can be removed by sliding the structure 11 away from the discharge opening 14. To assist in the removal of the structure 11, a pair of slide support members 55 is secured in the preferred embodiment, to support member 22 on diametrically opposed sides thereof. An inclined frame 56 is positioned to engage slide support members 55 so that the discharge structure 11 may slide downwardly along the incline of frame 56. Thus, the structure 11 and chain scraper 42 with housing 43 slide along hopper bottom 13 for removal through discharge opening 14. In FIGURE 1, as hereinabove described, the discharge structure 11 is removed with motors 30, 32 and chains 28, 34 in engagement with sprockets 27, 35; whereas, in FIGURE 2, the chains are disconnected, and the motors remain supported by motor support member 50 attached to the hopper 10.

Thus, an improved, removable discharge assistance structure for a hopper has been described and illustrated wherein repair and replacement of said structure are facilitated regardless of radial position of said structure relative to said hopper.

Various modes of carrying out the invention are contemplated as being within the scope of the following claims particularly pointing out and distinctly claiming the subject matter which is regarded as the invention.

I claim:

1. In a cylindrical hopper for receiving and discharging material, a conical bottom wall for said hopper provided with a central discharge opening, a discharge chute depending from said bottom wall at the discharge opening thereof, a scraper carried by said discharge chute and extending angularly therefrom into said hopper and adjacent to and parallel with the conical bottom wall thereof for loosening and directing material from within said hopper toward its discharge opening, power means for driving said scraper, and means for mounting and detachably securing said discharge chute and said power means on the bottom wall of said hopper whereby said chute and said scraper are removable with said power means as a unit along a plane substantially parallel with the plane of said conical bottom wall.

2. A hopper according to claim 1, wherein the discharge chute is journalled for rotation below the discharge opening of the hopper and is driven by the power means for driving the scraper.

3. A hopper according to claim 2, wherein the rotatable discharge chute and the scraper along with the power drive means are all mounted on a common support detachably secured to an annular flange surrounding the discharge opening of the hopper.

4. A hopper according to claim 2, wherein the scraper comprises an endless chain traversing a pair of sprockets and carrying spaced blades, the scraper being revolvable with the chute and the blade carrying chain being separately advanced about the sprockets.

5. A hopper according to claim 1 wherein a frame having an inclined ramp is provided for facilitating removal of the chute, scraper and power means as a unit from the hopper, the inclination of the ramp corresponding to the plane of the conical bottom wall.

References Cited by the Examiner

UNITED STATES PATENTS 1,936,341 11/33 Swanson.
2,799,407 7/57 Vanier et al.
2,948,422 8/60 Hilderbrand.

HUGO O. SCHULZ, *Primary Examiner.*